Patented Jan. 9, 1951

2,537,926

UNITED STATES PATENT OFFICE 2,537,926

PREPARATION OF PHOSPHORUS- AND SULFUR-CONTAINING MATERIALS

Harry J. Andress, Jr., Woodbury, N. J., assignor to Socony-Vacuum Oil Company, Incorporated, a corporation of New York No Drawing. Original application October 5, 1945, Serial No. 620,653. Divided and this application July 31, 1946, Serial No. 687,537

8 Claims. (Cl. 260—461)

This invention has to do with a new and novel class of phosphorus- and sulfur-containing reaction products obtained by reaction of phosphorus pentasulfide and a hydroxyaromatic compound.

As is well known to those familiar with the art, dithiophosphoric acids are readily prepared by reacting one molar proportion of $P_2S_5$ with four molar proportions of an alcohol or phenol under suitable reaction conditions. These acids, and metal salts thereof, have been used as wetting agents, flotation agents, mineral oil improving agents, etc. Unfortunately, however, the acids, prepared as indicated above, are of dark color, are corrosive towards such metals as copper, and tend to decompose, with the evolution of hydrogen sulfide, when heated. Shortcomings such as these have restricted their application, particularly to those uses wherein relatively low operating temperatures are involved.

The present invention is predicated upon the discovery of a new and novel class of phosphorus- and sulfur-containing reaction products, and metal salts thereof, which are substantially free from the foregoing undesirable characteristics of dithiophosphoric acids. These new reaction products are acidic, contain phosphorus and sulfur, and are obtained by reaction of one molar proportion of $P_2S_5$ and about two molar proportions of a hydroxyaromatic compound. Metal salts of the acidic reaction products are obtained by reacting a reaction product of the aforesaid type with a suitable metal compound, as described in detail hereinafter.

Examples of the hydroxyaromatic compounds of phenols which may be used in preparing the reaction products contemplated herein are: phenols, resorcinol, hydroquinone, catechol, cresol, xylenol, hydroxydiphenyl, benzylphenol, phenylethylphenol, phenolresins, methylhydroxydiphenyl, guiacol, alpha- and beta- naphthol, alpha- and beta- methyl naphthol, tolyl naphthol, xylyl naphthol, benzyl naphthol, anthranol, phenylmethylnaphthol, phenanthranol, monomethylether of catechol, chlorphenol and the like.

As indicated above by the list of illustrative hydroxyaromatic compounds, such compounds may contain alkyl substituents. Those hydroxyaromatic compounds which contain one or more relatively long-chain alkyl substituents are desirable for use in preparing acidic, phosphorus- and sulfur-containing reaction products (and metal salts thereof) characterized by substantial miscibility or solubility in hydrocarbon fractions such as mineral lubricating oil. In preparing these alkyl-substituted hydroxyaromatic compounds, relatively high molecular weight halides such as paraffin wax halides may be reacted with a hydroxyaromatic compound in the presence of a Friedel-Crafts catalyst. For example, petroleum wax which is a paraffinic hydrocarbon obtained from petroleum and which has at least about 20 carbon atoms per molecule can be chlorinated to various degrees in order to obtain several chlorine-substituted waxes such as monochlorowax, dichlorowax, and the like. Preference is given here to chlorowaxes obtained by chlorination of a petroleum wax having a melting point not substantially less than 120° F., a molecular weight of about 250 and at least about 20 carbon atoms per molecule. It will be understood from this description that the term "chlorowax" when used herein refers to a material containing one or more chlorine atoms and a relatively high molecular weight alkyl or radical obtained from a hydrocarbon fraction identified as paraffin wax.

By way of illustration, wax-substituted phenol prepared according to the foregoing procedure, in which a quantity of chlorowax containing three atomic proportions of chlorine is reacted with one mol of phenol and in which the chlorowax contains 20 per cent of chlorine will, for brevity herein, be designated as "wax- phenol (3—20)." Parenthetical expressions of the type (A—B) are used hereinafter in connection with the alkyl hydroxyaromatic compounds to designate; (A) the number of atomic proportions of chlorine in the chloro-aliphatic material reacted with one mol of hydroxyaromatic compound in the Friedel-Crafts reaction, and (B) the chlorine content of the chloroaliphatic material. In the above example A=3 and B=20. This same designation is also applied hereinafter to acidic, phosphorus- and sulfur-containing reaction products, (and metal salts thereof) of this invention.

Although any of the catalysts of the group known in the art as Friedel-Crafts catalysts may be used in preparing alkyl-substituted hydroxyaromatic compounds for the purposes of this invention, aluminum chloride is preferred. In this connection when an alkyl-substituted hydroxyaromatic compound is prepared by a Friedel-Crafts synthesis, the reaction mixture obtained by reacting an alkyl halide and a hydroxyaromatic compound in the presence of a catalyst such as aluminum chloride, the reaction mixture may be reacted directly—without isolating the alkyl-substituted hydroxyaromatic compound—with $P_2S_5$ in the ratio of two molar proportions of hydroxyaromatic compound present in the alkyl-substituted derivative thereof to one molar proportion of $P_2S_5$. The acidic, phosphorus- and sulfur-containing reaction products obtained by this procedure are outstanding in regard to heat stability, freedom from corrosivity toward copper and light color.

It will be apparent, of course, that alkyl-substituted hydroxyaromatic compounds prepared by procedures other than the Friedel-Crafts synthesis can be used. For example, such compounds can be prepared by reacting an olefin, such as a high molecular weight olefin, and a hydroxyaromatic compound in the presence of a condensation agent such as sulfuric acid, zinc chloride or the like.

In reacting $P_2S_5$ with a hydroxyaromatic compound in the proportions indicated above, elevated temperatures are used. Generally, temperatures from about 100° C. to about 200° C. provide satisfactory results with reaction temperatures of about 175° C. being preferred. The reaction may be carried out in the absence of an inert diluent, although if it is preferred, an inert diluent such as tetrachloroethane, kerosene, Stoddard's solvent, mineral lubricating oil fractions and the like may be used. When tetrachloroethane, kerosene or other relatively low boiling diluents are used, they may be readily removed from the reaction mixture by distillation. The use of a relatively high boiling diluent such as a mineral lubricating oil fraction provides a convenient means for obtaining mineral oil concentrates of the desirable reaction product, the oil being retained with the reaction product rather than separated therefrom by fractionation.

It has also been found that further improvement in color and stability of the reaction products can be obtained by treating the $P_2S_5$ reaction mixture with a small amount of finely divided zinc, such as zinc dust. The amount of zinc used is relatively small, as from about 1 per cent to about 2 per cent, and preferably about two per cent, based upon the quantity of the alkylated hydroxyaromatic compound used in the reaction. Accompanying the finely divided zinc is a small amount of water about ½%. The $P_2S_5$ reaction product, zinc and water, are stirred together, generally at about 100° C. for fifteen to twenty minutes. Water is removed thereafter by heating the mixture at about 110° C. and the water-free mixture is filtered through a suitable filter medium to obtain the final reaction product.

Metal salts of the above-described acidic, phosphorus- and sulfur-containing reaction products are also contemplated herein, and can be prepared by any of the well-known procedures for making metal salts of organic acids. For example, the sodium salt may be prepared by reacting said acidic reaction product with a sodium alcoholate and thereafter distilling off the alcohol. Other metal salts can be prepared from the sodium salt by metathesis with a suitable metal compound such as halide, as indicated above. When a substantially inert diluent is used in the reaction of $P_2S_5$ and a hydroxyaromatic compound, the diluent may be removed prior to the formation of a metal salt or may be removed after the metal salt has been formed. Also, a mineral lubricating oil concentrate or blend containing a metal salt of the foregoing acidic reaction product may be prepared by using a mineral lubricating oil as the diluent and retaining the same with the reaction product.

The metals contemplated herein may be broadly classified as metals of the groups I through VIII of the periodic system. These metals comprise the following: The alkali metals lithium, sodium, potassium, rubidium and caesium; the alkaline earth metals beryllium, magnesium, calcium, strontium, and barium; the metals zinc, cadmium, and mercury, scandium, lanthanum, aluminum, gallium, indium, thallium, titanium, zirconium, cerium, thorium; germanium, tin and lead; vanadium, columbium and tantalum; arsenic, antimony and bismuth; chromium, molybdenum, tungsten and uranium, rhenium, manganese, iron, cobalt and nickel; ruthenium, rhodium, palladium; osmium, iridium and platinum.

Some of the rare earth metals are mentioned in the foregoing passage. Other rare earth metals suitable for formation of dithiophosphoric acid salts are those now commercially available as the cerium and yttrium group namely, a mixture of praseodymium, neodymium, samarium, europium, gadolinium, terbium, dysprosium, holmium, erbium, thallium and lutecium.

Further details in the character of the acidic, phosphorus- and sulfur-containing reaction products (and metal salts thereof) of this invention will be apparent from the following illustrative examples:

EXAMPLE I

Petroleum wax of A. S. T. M. melting point of 126° F. was chlorinated by introducing chlorine gas therein at about 100° C. until 14 per cent by weight of chlorine was adsorbed. One hundred grams of the chlorowax were then mixed with 12.3 grams of phenol and three grams of aluminum chloride were added thereto at about 85° C., at a rate sufficiently slow to avoid excessive foaming caused by the evolution of hydrogen chloride. The reaction temperature was then raised to about 175° C. and the reaction mixture was stirred for about one hour at this temperature to complete the reaction. The product at this stage was the aluminum phenate of wax-phenol (3—14), containing combined chlorine.

Two hundred grams of a solvent-refined mineral oil having a Saybolt Universal viscosity (S. U. V.) of 45 seconds at 210° F. were added to the aforesaid phenate derivative, followed by the addition of 14.8 grams of $P_2S_5$. The reaction mixture thus obtained was heated for four hours at 175° C. The reaction with $P_2S_5$ was substantially completed after heating for two hours at this temperature, as indicated by the decrease in the amount of hydrogen sulfide evolved during the reaction, but the reaction mixture was heated for an additional period of two hours to insure completion of the reaction. The reaction mixture was then cooled to about 110° C. and two grams of zinc dust were added thereto followed by the addition of 0.5 gram of water. The reaction mixture formed thereby was heated for about fifteen to twenty minutes at 100° C., and was thereafter filtered through a filter aid, Hi-Flo. The filtrate thus obtained was distilled to a maximum temperature of 150° C. at 10 mms. pressure, whereupon the finished product (Product One) was obtained as a one to three (one part reaction product and two parts oil) blend in mineral oil. The oil blend contained 1.3 per cent phosphorus, 2.0 per cent sulfur, and had a neutralization number (N. N.) of 10.

EXAMPLE II

One hundred grams of wax-phenol (3—14) were diluted with 200 grams of the solvent-refined mineral oil described in Example I above and the resultant oil blend was heated to about 150° C. 14.8 grams of $P_2S_5$ were then added and the reaction mixture thus formed was quickly heated to about 175° C. The reaction mixture was then heated for about four hours at 175° C. After cooling the reaction mixture to about 95° C., five grams of zinc dust and three grams of water were added thereto. The zinc treated reaction mixture was then heated for fifteen to twenty minutes at about 100° C. The reaction mixture was then filtered through Hi-Flo, and the filtrate therefrom was distilled to a maximum temperature of 150° C. at 10 mms. pressure. The finished product (Product Two) is a one to three blend in mineral oil and has the following analysis: 1.3 per cent phosphorus, 2.0 per cent sulfur, and neutralization number (N. N.) of 10.0.

EXAMPLE III

A reaction product related to Product Two, prepared as described in Example II above, was prepared in exactly the same manner as Product Two with the salient distinction, however, that a molar ratio of four molar proportions of phenol contained in wax-phenol (3—14) to one molar proportion of $P_2S_5$ was used. This product—Product Three—contained 0.6 per cent phosphorus, 1 per cent sulfur and has a neutralization number (N. N) of 6.3.

Product Three is presented herein for the purpose of comparing the same with Product Two which was prepared with a two to one molar ratio. As indicated hereinafter by typical oil test data, materials of the type of Product Two are outstandingly superior to those of the type of Product Three and possess an action different in kind than that typified by Product Three.

EXAMPLE IV

A quantity of Product Two was heated with twenty per cent of barium hydroxide octahydrate, until the water of crystallization and water from the reaction were distilled out by gradually raising the temperature. The product (Product Four) was a 1:3 oil blend containing 2.7 per cent barium, 1.3 per cent phosphorus and 2.0 per cent sulfur.

EXAMPLE V

A quantity of Product Three was treated with barium hydroxide octahydrate in the same manner as was Product Two in Example IV. The product so obtained, Product Five was a 1:3 oil blend containing 2.7 per cent barium, 0.6 per cent phosphorus and 1.0 per cent sulfur.

To demonstrate the effectiveness of the acidic, phosphorus- and sulfur-containing reaction products (and metal salts thereof) of this invention, comparative oil test data obtained by such representative mineral oils alone and with blends thereof containing a typical reaction product to various well-known tests is presented hereinbelow.

POUR TEST

These tests were conducted with a mineral lubricating oil fraction having a Saybolt Universal viscosity (S. U. V.) of 67 seconds at 210° F. and an A. S. T. M. pour point of 20° F. The results for the blank oil and the oil blends are listed below in Table 1:

Table 1

| Improving Agent | Conc., Percent by Wt. | A. S. T. M. Pour Test |
|---|---|---|
| | | °F. |
| None | | +20 |
| Product One | 0.125 | −20 |
| Product Two | 0.125 | −20 |

VISCOSITY INDEX IMPROVEMENT

The improvement produced by the improving agents of the present invention in the viscosity index of mineral oils to which they are added is clearly shown by the illustrative data shown in Table 2 below:

Table 2

| Improving Agent | Conc., Per Cent by Wt. | Kinematic Vis. at— | | V. I. |
|---|---|---|---|---|
| | | 100° F. | 210° F. | |
| None | | 30.10 | 4.77 | 77.1 |
| Product Two | 1.0 | 36.0 | 5.55 | 99.2 |
| (Product Three | 1.0 | 32.74 | 5.11 | 88.6) |

OPERATION TEST

The effectiveness of the reaction product contemplated herein in stabilizing motor oils against the deleterious effects of oxidation is indicated by an accelerated test in a one-cylinder Lauson engine operated at an oil temperature of 290° F. and a jacket temperature of 212° F. A motor oil having a Saybolt Universal viscosity (S. U. V.) of 45 seconds at 210° F. was used with and without the addition agents, and the neutralization number (N. N.) and the Saybolt Universal viscosity (S. U. V.) at 210° F. were determined after 36 hours. The results of these tests are tabulated in Table 3 below.

Table 3

| Improving Agent | Conc., Per Cent by Wt. | N. N. | S. U. V. at 210° F. |
|---|---|---|---|
| None | | 10.0 | 12.71 |
| Product One | 0.67 | 1.3 | 6.54 |
| Product Two | 1.0 | 1.5 | 6.55 |
| (Product Three | 1.0 | 3.9 | 7.66) |

ACCELERATED OXIDATION TEST

An accelerated oxidation test has been used in order to determine the corrosive nature of lubricating oils under simulated operating conditions. The apparatus used consists of a circulating arrangement whereby oil at 325° F. under a pressure of ten pounds per square inch, is sprayed against a standard cadmium-nickel bearing for a period of five or fifteen hours. The amount of oil under constant circulation in the system is 1,500 ccs. In passing through the system, the oil comes into contact with cast iron, steel, stainless steel, copper and the aforesaid cadmium-nickel bearing, and is also exposed to aeration. The oil used in this test contains a small amount of an accelerator, namely, iron naphthenate (commercially designated as Nuodex, six per cent $Fe_2O_3$) which greatly increases the rate of oxidation of the oil. The degree of oxidation suffered by the oil is shown by the development of acidity therein as measured by the neutralization number (N. N.), the loss in weight of the cadmium-nickel bearings and the percentage of viscosity increase of the oil. The oil used was a solvent-refined oil having a Saybolt Universal viscosity (S. U. V.) of 65 seconds at 210° F. and containing 0.17 per cent of Nuodex. The results of these tests are tabulated below in Table 4.

*Table 4*

| Improving Agent | Conc., Per Cent by Wt. | N. N. | Time, Hrs. | Bearing Loss, Mgms. |
|---|---|---|---|---|
| None | | | .5 | 1.6 |
| Product | 0.67 | | 15 | 0.001 |
| Product Two | 1.0 | | 15 | 0.003 |
| (Product Three | 1.0 | | .5 | 0.02) |
| Product Four | 1.0 | 1.8 | 15 | 0.002 |
| (Product Five | 1.0 | 7.1 | 5 | 0.778) |

It will be apparent from the results presented in Table 4 that Product Three is much less effective in inhibiting bearing loss than is Product Two, which is directly comparative therewith. It will be noted that Product Three was characterized by a bearing loss of almost seven times that which characterizes Product Two in one-third the test period. This is evidence of a different kind of action possessed by products of the type of Product Two. A similar difference in kind is exhibited by Product Four when compared with Product Five.

RING STICKING TEST

In addition to the foregoing tests a typical oil and an oil blend thereof containing a representative improving agent were subjected to a single-cylinder C. F. R. Engine Test, i. e., actual engine operating conditions. The engine was operated continuously over a time interval of twenty-eight hours, with the cooling medium held at a temperature of about 390° F. and at a speed of 1,200 R. P. M., which is equivalent to a road speed of about twenty-five miles per hour. The oil temperature was held at about 150° F. during the test.

The oil used in this test was a lubricating oil stock of 120 seconds Saybolt Universal viscosity (S. U. V.) at 210° F. and the conditions observed at the end of the test were: (A) the extent to which the piston rings were stuck; (B) the extent to which the slots in the oil rings were filled with deposit; (C) the amount of carbonaceous deposits on the piston; and (D) the acidity or neutralization number (N. N.) of the oil at the end of the test. The results of this test are presented below in Table 5.

*Table 5*

| Improving Agent | Conc., Per Cent by Wt. | Ring Condition | | | | | | | | Carbon Deposits | N. N. |
|---|---|---|---|---|---|---|---|---|---|---|---|
| | | Degrees Stuck | | | | | Slots Filled | | | | |
| | | 1 | 2 | 3 | 4 | 5 | 3 | 4 | 5 | | |
| None | | 360 | 360 | 360 | 360 | 360 | 60 | 30 | 20 | 11.7 | 2.3 |
| Product One | 0.67 | 0 | 0 | 0 | 0 | 0 | 0 | 0 | 0 | 6.9 | 1.4 |

DIESEL ENGINE OPERATION

A single-cylinder General Motors Diesel engine was run with a twelve hour break-in period followed by a sixty-nine hour test. The oil temperature was maintained at 230° F., the jacket temperature at 130° F. and the speed thereof was maintained at 1,800 R. P. M. At the end of the test the amount of port closure was determined and reported as per cent closure. This test is known in the art as the 1—71 General Motors Diesel Engine Test. The results of this test are tabulated below in Table 6.

*Table 6*

| Improving Agent | Conc., Per Cent by Wt. | Port Clogging |
|---|---|---|
| None | | 30 |
| Product One | 1.33 | 9 |

It will be apparent from the foregoing that the reaction products of this invention are outstanding for use in mineral oils. The amount of improving agent used may be varied depending upon the mineral oil or mineral oil fraction with which it is blended and the properties desired in the final oil composition. The acidic reaction products, and metal salts thereof, may be used in amounts ranging from about $\frac{1}{16}$ per cent to about 5 per cent and in general compositions of the desired improved properties may be obtained with these materials in amounts of from about $\frac{1}{16}$ per cent to about 2 per cent.

It is to be understood that this invention is not to be construed as limited to the foregoing illustrative examples but is to be broadly construed in the light of the language of the appended claims.

This application is a division of copending application Serial Number 620,653, filed October 5, 1945, now Patent No. 2,506,570, which, in turn, is a continuation-in-part of application Serial Number 489,086, filed May 29, 1943, with Orland M. Reiff, now Patent No. 2,386,207.

I claim:

1. As a new composition of matter, an acidic phosphorus- and sulfur-containing reaction product obtained by reacting one molar proportion of phosphorus pentasulfide with approximately two molar proportions of a chloro-wax-phenol, in the presence of a Friedel-Crafts catalyst at a temperature between about 100° C. and about 200° C.

2. As a new composition of matter, an acidic phosphorus- and sulfur-containing reaction product obtained by reacting one molar proportion of phosphorus pentasulfide with approximately two molar proportions of a chloro-wax-phenol, at a temperature between about 100° C. and about 200° C., and treating the reaction mixture thus formed with a small amount of finely divided zinc and water.

3. As a new composition of matter, an acidic phosphorus- and sulfur-containing reaction product obtained by reacting one molar proportion of phosphorus pentasulfide with approximately two molar proportions of a chloro-wax-phenol in the presence of a Friedel-Crafts catalyst, at a temperature between about 100° C. and about 200° C., and treating the reaction mixture thus formed with a small amount of finely divided zinc and water.

4. As a new composition of matter, an acidic phosphorus- and sulfur-containing reaction product obtained by reacting one molar proportion of phosphorus pentasulfide with a paraffin chloro-wax-substituted phenol containing approximately two molar proportions of phenol in the presence of aluminum chloride, at a temperature between about 100° C. and about 200° C., and treating the reaction mixture thus formed with a small amount of zinc dust and water.

5. The method of making an acidic, phosphorus- and sulfur-containing reaction product of a chloro-wax-phenol, which comprises: reacting one molar proportion of phossphorus pentasulfide with approximately two molar proportions of a chloro-wax-phenol in the presence of a Friedel-Crafts catalyst, at a temperature between about 100° C. and about 200° C., to form a reaction mixture containing said reaction product; and separating said reaction product from said reaction mixture.

6. The method of making an acidic, phosphorus- and sulfur-containing reaction product of a chloro-wax-phenol, which comprises: reacting one molar proportion of phosphorus pentasulfide with approximately two molar proportions of a chloro-wax-phenol, at a temperature between about 100° C. and about 200° C., to form a reaction mixture containing said reaction product; treating said reaction mixture with a small amount of finely divided zinc and water; and separating said reaction product from the reaction mixture formed in the last-mentioned operation.

7. The method of making an acidic, phosphorus- and sulfur-containing reaction product of a chloro-wax-phenol, which comprises: reacting one molar proportion of phosphorus pentasulfide with approximately two molar proportions of a chloro-wax-phenol in the presence of a Friedel-Crafts catalyst, at a temperature between about 100° C. and about 200° C., to form a reaction mixture containing said reaction product; treating said reaction mixture with a small amount of finely divided zinc and water; and separating said reaction product from the reaction mixture formed in the last-mentioned operation.

8. The method of making an acidic, phosphorus- and sulfur-containing reaction product of a paraffin wax-substituted phenol, which comprises: reacting one molar proportion of phosphorus pentasulfide with a paraffin chloro-wax-substituted phenol containing approximately two molar proportions of phenol in the presence of aluminum chloride, at a temperature between about 100° C. and about 200° C., to form a reaction mixture containing said reaction product; treating said reaction mixture with a small amount of zinc dust and water; and separating said reaction product from the reaction mixture found in the last-mentioned operation.

HARRY J. ANDRESS, Jr.

REFERENCES CITED

The following references are of record in the file of this patent:

UNITED STATES PATENTS

| Number | Name | Date |
|---|---|---|
| 1,593,232 | Whitworth | July 20, 1926 |
| 1,772,386 | Derby et al. | Aug. 5, 1930 |
| 2,226,334 | Cantrell et al. | Dec. 24, 1940 |
| 2,316,086 | MacLaren | Apr. 6, 1943 |
| 2,365,938 | Cook et al. | Dec. 26, 1944 |
| 2,386,207 | Reiff et al. | Oct. 9, 1945 |
| 2,388,199 | Williams et al. | Oct. 30, 1945 |
| 2,410,650 | Giammaria | Nov. 5, 1946 |

Certificate of Correction

Patent No. 2,537,926                                          January 9, 1951

HARRY J. ANDRESS, Jr.

It is hereby certified that error appears in the printed specification of the above numbered patent requiring correction as follows:

Column 4, line 69, for "1 3 per cent" read *1.3 per cent*;

and that the said Letters Patent should be read as corrected above, so that the same may conform to the record of the case in the Patent Office.

Signed and sealed this 14th day of August, A. D. 1951.

[SEAL]

THOMAS F. MURPHY,
*Assistant Commissioner of Patents.*